3,277,202
FREE RADICAL PROCESS

Herbert L. Benson, Jr., Houston, Tex., and Isaac Dvoretzky, Orinda, Calif., assignors to Shell Oil Company, New York, N.Y., a corporation of Delaware
No Drawing. Filed Oct. 4, 1963, Ser. No. 313,734
6 Claims. (Cl. 260—676)

This invention relates to the reactivity of organic free radicals in non-aqueous media. More particularly, it relates to a method for the modification of the reactivity of organic free radicals in hydrocarbon solution.

Extensive studies have been made of the behavior of organic free radicals in aqueous solution. In such media, free radicals are easily generated by decomposition of peroxides, by photolysis of various organic compounds, or by one-electron transfers to carbonium ions or from carbanions. The use of an aqueous medium allows the presence in the reaction medium of water-soluble metallic compounds, particularly salts of multivalent metals, which compounds frequently facilitate the production of free radicals and on occasion, subsequently modify the reactive nature of the radicals produced.

When the reaction medium is non-aqueous, however, greater problems are attendant to the production of organic free radicals, and little is known about the modification of radical reactivity. The reaction conditions are readily distinguished by the consideration that the use of simple metallic ions in all but the most polar non-aqueous media is effectively prohibited by diminished solubility. When the reaction medium is a hydrocarbon, the essentially insoluble character of agents conventionally employed to modify radical reactivity precludes their use.

Upon production of free radicals in hydrocarbon solution, the reactive nature of the radicals leads to a variety of possible reaction paths. These include (a) coupling, e.g.,

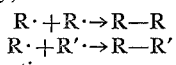

(b) disproportionation, e.g.,

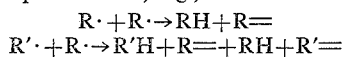

and (c) hydrogen abstraction, e.g.,

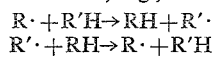

where R· represents the radical initially produced, R'H represents the hydrocarbon solvent and R'· represents a radical derived therefrom, and R= and R'= represent olefin moieties obtained by removal of a hydrogen atom from the carbon atom adjacent to the carbon atom possessing the free electron in the radicals R· and R'·.

The benefit to be derived from successfully modifying the radical reactivity is apparent from consideration of the spectrum of products obtained from processes such as are depicted above. Problems of modifying the reactivity of the organic free radicals are therefore problems of controlling the relative rates of reaction types (a), (b) and (c). Reaction type (c) is generally considered to be a more highly energetic reaction type, that is, to require a higher activation energy, and is favored by the conditions normally attendant to free radical production. Such a process, however, produces few useful products, as the overall process results largely in the conversion of the free radical initially generated to the corresponding hydrocarbon. It would be of considerable advantage to provide a method for the modification of free radical behavior in non-aqueous solution, so that more efficient use may be made of the free radicals generated, e.g., through the promotion of reaction types (a) and (b).

It is therefore an object of the present invention to provide a method for the modification of free radical reactivity in non-aqueous media. More particularly, it is an object to provide a process for the modification of the reactivity of aliphatic free radicals in hydrocarbon solution, by which process more extensive utilization of lower-energy radical reaction processes is obtained.

It has now been found that these objects are accomplished when aliphatic free radicals are generated in hydrocarbon solution in the presence of a metal-containing catalyst. Such catalysts appear to engage in interactions with the free radicals that are formed to promote processes of coupling or disproportionation.

The catalysts of the invention are organometallic compounds or are metal complexes with organic ligands and are soluble in the hydrocarbon solvent. The solubility required of the metal-containing catalyst is slight, as only catalytic quantities of catalyst are required to produce the desired modification of the free radical reactivity. Some suitable catalysts are extensively soluble in the hydrocarbon reaction media, and in such cases, any convenient amount of catalyst may be used. Alternatively, other catalysts have limited solubility in the hydrocarbon media and suitable concentrations of such catalysts may approach saturation. In general, amounts of catalyst less than about 0.0005% by weight based on the reaction mixture are frequently unsatisfactory due to the inevitable physical loss of catalyst during the reaction process. Alternatively, amounts of the metal-containing catalyst greater than about 5% by weight based upon the reaction mixture offer no apparent compensating advantage for the added expense of employing such quantities of catalyst.

The metal moiety of the catalyst may have a calculated oxidation state that is greater than zero, or the metal may be employed in a complex wherein the calculated oxidation state of the metal is zero or is negative. The metal-containing catalyst may contain solely organic moieties, excluding the metal, or may contain inorganic radicals or anions in addition to sufficient organic moieties to impart to the catalyst solubility in the hydrocarbon media. Illustrative of suitable catalysts are:

(a) metal and non-metal alkyls, such as n-butyl lithium, dimethyl cadmium, tetraethyl tin, tetraethyl lead, dimethyl diethyl lead, methylene bis(trimethyl lead), triethylphosphine, tri-n-butylphosphine, trimethylarsine, diethyltelluride and the like.

(b) metal salts of organic acids, such as copper naphthenate, mercury naphthenate, zinc propiolate, thallium oleate and manganese naphthenate, (c) metal salts of organic active hydrogen compounds, such as ferric tris(dipivaloylmethide), vanadium propionylacetonate, cobalt acetylacetonate, and thallium ethyl acetoacetate, (d) organometallic compounds of the type frequently referred to as "sandwich" compounds, e.g., ferrocene, biscyclopentadienylmanganese, dibenzenechromium and biscyclopentadienylcobalt (III) salts, (e) metal carbonyl complexes, such as dicobalt octacarbonyl, nickel tetracarbonyl, iron pentacarbonyl, iron tetracarbonyl and FeNi(CO)$_9$, (f) metallic complexes not containing carbon monoxide ligands, such as tetrakis(triethylphosphine)nickel, tetrakis(tributylphosphite)cobalt and similar complexes of Group VIII metals, e.g., iron, nickel, osmium and platinum and other transition metals with organo phosphine and phosphite ligands, and (g) metallic complexes containing carbon monoxide and other ligands such as methylcyclopentadienylmanganesetricarbonyl, cyclopentadienyltriethylphosphinecopper, bis(tributylphosphine)dicobalt hexacarbonyl and (diphenylphosphino)methyldiphenylphosphine dicobalt hexacarbonyl.

The preferred catalyst type, however, comprises complexes of metallic ions, preferably of transition variable-valence metals, and moieties of hydrocarbon-soluble hydrocarbyl partial esters of polybasic inorganic acids, e.g., borates, silicates and phosphonates, but especially diesters of phosphoric acid such as dialkylphosphoric acid. Such complexes are typically prepared by reacting the partial ester, e.g., dialkylphosphoric acid, with metal oxides or hydrous oxides, or mixtures of the oxide and a salt of the metal, in the presence or in the absence of a hydrocarbon solvent. Although the structure of these catalysts is not clearly understood, it is believed that in hydrocarbon solution at least the phosphate ester salts are polymeric materials represented by the formula

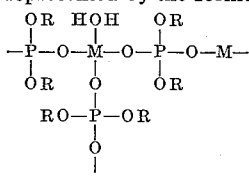

when no non-phosphate anion is present, that is, the catalyst is prepared in the absence of a metallic salt, or are of the general formula

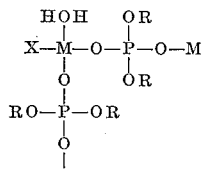

when the preparation of the catalyst includes a metallic salt, MX. In the above-depicted formulas, M represents a metallic ion, preferably the ion of a transition metal, e.g., cobaltous, cupric, nickelous, ferric, cuprous, mercuric, stannous, chromic or the like, R represents an alkyl radical, preferably having from 1 to 10 carbon atoms, e.g., methyl, ethyl, butyl, isobutyl, amyl, tert-amyl, hexyl, octyl, 2-ethylhexyl and decyl, and X represents the anion of the metal salt, MX, employed to form the catalyst, e.g., chloride, nitrate, sulfate, bisulfate, acetate, bicarbonate or the like. Preferred catalysts of this type are compounds of cobalt.

A typical preparation of the preferred catalyst type comprises mixing the metal oxide, dialkylphosphoric acid and metal salt, if a metallic salt is employed, in a hydrocarbon solution, eg., heptane, and stirring or shaking the reaction mixture at room temperature or above, e.g., up to about 120° C., until reaction is complete. The catalyst thus produced is recovered by filtration or by evaporation of solvent. Suitable dialkylphosphoric acids to be employed in the production of catalyst by such a process include dimethylphosphoric acid, diethylphosphoric acid, dibutylphosphoric acid, di(2-ethylhexyl)phosphoric acid and didecylphosphoric acid. When the catalyst is prepared by reacting the metallic oxide or hydrous oxide with dialkylphosphoric acid, it is desirable to employ the phosphoric acid in molar excess over the metallic oxide, and ratios of dialkylphosphoric acid to metal oxide of from about 2:1 to about 10:1 are preferred. The catalysts most preferred, however, are those prepared by the inclusion within the reaction mixture of amounts of metallic salt in order to incorporate anions within the catalyst product. In such preparations, it is advantageous to employ molar amounts of metal oxide that are equivalent to or in excess over the amount of metal salt, and best results are obtained when the molar ratios of oxide to salt is from about 1:1 to about 5:1.

The process of the invention relates to the modification of free radical behavior in hydrocarbon media. While the hydrocarbon employed as solvent will, of course, in part determine the products produced, the use of particular hydrocarbons is not required. In general, suitable hydrocarbons are liquid at the reaction temperature, and are aliphatic, including cycloaliphatic hydrocarbons and aliphatic hydrocarbons with aromatic substituents. Particularly suitable are hydrocarbons having from 4 to 20 carbon atoms, preferably from 5 to 10 carbon atoms, and preferably containing no acetylenic unsaturation. Illustrative hydrocarbons include alkanes such as pentane, isopentane, hexane, 2-methylhexane, neohexane, heptane, octane, isooctane, decane, dodecane, hexadecane and eicosane; alkenes, including polyenes, such as 2-methylbutene, octadiene, decatriene, hexene, octene, 2,4-dimethyloctene, decene and pentadecene; cycloalkanes such as cyclopentane, cyclohexane and 2,2,4-triethylcyclohexane; and cycloalkenes such as cyclohexene, cyclopentene and cyclooctadiene. In general, saturated hydrocarbons are preferred as reaction media over olefinic hydrocarbons, and monoolefins are preferred over polyolefinic hydrocarbons.

The source of free radicals in the process of the invention is not material, so long as the method of radical production does not substantially alter the catalyst or reaction medium. Largely for reasons of convenience, a preferred method for free radical production comprises the photolysis of dialkyl ketones, the light-induced cleavage of which results in the production of alkyl radicals, e.g., from di-tert-butyl ketone are obtained tert-butyl free radicals. Preferred dialkyl ketones for this purpose are those wherein the alkyl moieties independently contain from 1 to 6 carbon atoms. Wave lengths of light sufficiently energetic to effect ketone photolysis are in general satisfactory, provided that the particular wave length chosen is not within the region of catalyst absorption. By the use of suitable filters in conjunction with a conventional light source, catalyst activation is avoided. Suitable wave lengths of light to bring about ketone photolysis and attendant free radical production are in the ultraviolet region, and preferred are wave lengths between about 2100 A. and 4000 A.

The generation of free radicals by ketone photolysis is typically effected by mixing the ketone and hydrocarbon solvent in a suitable reactor, frequently constructed of quartz, and irradiating the mixture with a source of ultraviolet radiation, e.g., a mercury arc lamp, equipped with suitable filters to screen out undesirable wave lengths. The hydrocarbon solvent is employed in molar excess over the ketone reactant, with concentrations of ketone from about 1% to about 15% by volume based upon the reaction mixture being suitable. The ketone photolysis is conduucted at any convenient temperature, with a temperature range from about 0° C. to about 80° C. or higher being satisfactory, although temperatures from about 20° C. to about 60° C. are preferred. Advantageous use is frequently made of ambient room temperature, e.g., about 25° C. Subsequent to reaction, the products are removed and are separated by conventional means such as by fractional distillation.

The process of the invention thus comprises generating aliphatic free radicals in hydrocarbon solution in the presence of a hydrocarbon-soluble metal-containing catalyst, the presence of which results in extensive modification of the reactivity of the free radicals formed. While the precise effect of the metal-containing catalysts is not completely understood, it is apparent that the free radicals interact in some manner with the metallic catalyst that results in the lowering of the free radical reactivity.

Thus, in the presence of the catalysts of the invention, greater proportions of the free radicals undergo low-energy reaction processes than when no catalyst is employed. The overall lowering of radical reactivity is manifested in an altered distribution of products from the radical reactions.

The effect of the presence of a catalyst on free radical reactivity is demonstrated by the photolysis of solutions of acetone in isopentane in the presence of cobalt catalyst complexes containing di(2-ethylhexyl)-phosphoric acid and various anions. The product distribution as shown in Table I was determined by gas-liquid chromatography.

*Table I*

| | | | |
|---|---|---|---|
| Acetone conc., percent v | 5 | 5 | 5 |
| Cobalt complex type | None | Chloride | Nitrate |
| Complex conc., percent v | 0 | 0.5 | 0.5 |
| Photolysis time, hours | 15 | 15 | 15 |
| Temperature, °C | 40–45 | 40–45 | 40–45 |
| | Mole Percent, Basis Total $C_5$–$C_6$ | | |
| Product: | | | |
| 2-methyl-1-butene | 32.4 | 36.4 | 45.9 |
| 2-methyl-2-butene | 58.7 | 24.4 | 15.9 |
| 2,2-dimethylbutane | 4.3 | 24.2 | 22.4 |
| 2,3-dimethylbutane | 2.7 | 10.1 | 10.3 |
| 2-methylpentane | 0.6 | 1.3 | 2.1 |
| 3-methylpentane | 1.1 | 2.9 | 3.4 |
| unidentified | 0.3 | 0.6 | |

It is observed from these data that in the presence of the cobalt complexes as catalysts, the product mixture contains a lesser amount of olefin resulting from hydrogen atom abstraction from the solvent and subsequent disproportionation of the radicals thereby produced. It is also observed that the total mole percent of $C_6$ hydrocarbon has increased by a factor of five in the presence of the catalyst employed. Further, the catalysts appear to be equally effective in promoting radical coupling, as essentially equal amounts of $C_6$ saturated hydrocarbon are obtained, independent of the anion moiety of the catalyst complex.

The type of radical modification that is observed is at least partly dependent on the extent of interaction between the catalyst and the particular type of free radical, particularly the degree of steric hindrance between the radical and the metal moiety of the catalyst. Thus, when the radical and catalyst are sterically able to engage in a strong interaction, a promotion of coupling processes is observed. Thus, comparably extensive coupling occurs when the free radicals are sterically small, e.g., when methyl or ethyl radicals are employed, or when the metal moiety of the catalyst is comparably free from hindrance by bulky ligands.

The data in Table II illustrate results obtained by photolysis of solutions of acetone in isopentane in the presence of cobalt complex of di(2-ethylhexyl)phosphoric acid.

*Table II*

| | | |
|---|---|---|
| Acetone conc., percent v | 5 | 5 |
| Cobalt complex conc., percent v. (chloride form) | 0 | 0.5 |
| Photolysis time, hours | 5 | 5 |
| Temperature, °C | 45 | 45 |
| | Yield, Moles per ml.×$10^6$ | |
| Product: | | |
| Ethane | 2.1 | 22.4 |
| Propane plus propylene | 4.2 | 23.1 |
| Isobutane | | 0.4 |
| n-butane | Trace | 1.4 |
| Isobutylene + 1-butene | 1.0 | 2.2 |
| Trans-2-butene | 1.8 | 1.8 |
| Cis-2-butene | 1.0 | 1.2 |
| 3-methyl-1-butene | 13.5 | 6.2 |
| 2-methyl-1-butene | 71.6 | 37.5 |
| 2-methyl-2-butene | 55.6 | 49.2 |
| 2,2-dimethylbutane | 1.8 | 10.6 |
| 2,3-dimethylbutane | 1.4 | 4.6 |
| 2-methylpentane | 0.3 | 1.6 |
| 3-methylpentane | 0.6 | 1.3 |

It is apparent from the data of Table II that the presence of the cobalt catalyst promotes a variety of coupling processes, particularly those producing $C_2$ and $C_6$ saturated hydrocarbons. Similar results are obtained from photolysis of diethyl ketone in isopentane in the presence of the cobalt catalyst employed in Table II. The results are given in Table III.

*Table III*

| | | |
|---|---|---|
| Ketone conc., percent v | 5 | 5 |
| Cobalt complex conc., percent v. (chloride form) | 0 | 0.5 |
| Photolysis time, hours | 5 | 5 |
| Temperature, °C | 25 | 25 |
| | Yield, Moles per ml.×$10^6$ | |
| Product: | | |
| Propane plus propylene | 2.7 | 3.3 |
| Butane | 31.7 | 39.2 |
| 2-butene | 2.4 | 1.8 |
| 3-methyl-1-butene | 5.9 | 5.2 |
| 2-methyl-1-butene | 24.7 | 29.9 |
| 2-methyl-2-butene | 8.9 | 17.1 |
| 3,3-dimethylpentane | 9.5 | 14.6 |
| 2,3-dimethylpentane | 9.0 | 7.9 |
| 3-methylhexane | 4.2 | 2.4 |

From a comparison of the data of Tables II and III, it is seen that as the radical size increases from methyl to ethyl, the catalyst employed being the same, the promotion of coupling is decreased. This is believed to be due to increased steric hindrance between the radical and the metal moiety of the catalyst. The preferred method of effecting radical coupling therefore comprises employing comparably small alkyl free radicals, or alternatively employing a catalyst with sterically smaller ligands, e.g., a cobalt catalyst derived from a dialkylphosphoric acid with small alkyl substituents, such as diethylphosphonic acid or dipropylphosphoric acid.

As the steric hindrance between radical and catalyst increases, although the yields of coupled product decrease, the yield of products obtained from processes of disproportionation, e.g., propane and propylene, increases. Table IV illustrates modification of reactivity of isopropyl radicals derived from photolysis of diisopropyl ketone in isopentane solution in the presence of the chloride form of the cobalt-di-(2-ethylhexyl)phosphoric acid catalyst.

*Table IV*

| | | |
|---|---|---|
| Ketone conc., percent v | 5 | 5 |
| Cobalt complex conc., percent v. (chloride form) | 0 | 0.5 |
| Photolysis time, hours | 3 | 3 |
| Temperature, °C | 45 | 45 |
| | Yield, Moles per ml.×$10^6$ | |
| Product: | | |
| Ethane | 6.6 | 3.0 |
| Propylene | 178 | 348 |
| Propane | 257 | 421 |
| Isobutylene plus 1-butene | 3.8 | 1.4 |
| Trans-2-butene | 0.9 | |
| Cis-2-butene | 0.3 | |
| 3-methyl-1-butene | 2.0 | |
| 2-methyl-1-butene | 7.4 | 3.5 |
| 2-methyl-2-butene | 6.2 | 1.7 |
| 2,3-dimethylbutane | 157 | 66.0 |
| 2-methylpentane | 6.4 | 5.1 |

Similar results are shown in Tables V and VI relating to the reactivity of tert-butyl radicals in isopentane solution and in neohexane solution, and isobutyl radicals in isopentane solution respectively. In all cases, the catalysts are of similar type to that of Table IV.

Table V

| Solvent | i-C$_5$ | i-C$_5$ | neo-C$_6$ | neo-C$_6$ | neo-C$_6$ |
|---|---|---|---|---|---|
| Ketone conc., percent v | 5 | 5 | 5 | 5 | 5 |
| Cobalt complex type | None | Chloride | None | Chloride | Nitrate |
| Complex conc., percent v | 0 | 0.5 | 0 | 0.5 | 0.5 |
| Photolysis time, hours | 3 | 3 | 5 | 5 | 5 |
| Temperature, °C | 25 | 25 | 25 | 25 | 25 |
| | Yield, Moles per ml.×10$^6$ | | | | |
| Product: | | | | | |
| Propane plus propylene | 33.4 | 41.6 | 27.3 | 34.3 | 42.0 |
| Isobutane | 265 | 284 | 251 | 310 | 318 |
| Isobutylene | 224 | 260 | 216 | 288 | 300 |
| 3-methyl-1-butene | 0.6 | 0.5 | | | |
| 2-methyl-1-butene | 5.6 | 3.8 | | | |
| 2-methyl-2-butene | 1.2 | 0.9 | | | |
| C$_7$ (unidentified) | 8.2 | 1.1 | 8.7 | 1.2 | 1.2 |
| 2,2,4-trimethylpentane | 3.2 | 1.1 | 5.8 | 1.3 | 1.3 |
| 2,4,4-trimethyl-1-pentene | 6.3 | 3.0 | 8.0 | 2.0 | 3.4 |
| 2,2,3,3-tetramethylbutane | 34.0 | 7.6 | 40.1 | 7.9 | 7.7 |

Table VI

| | | |
|---|---|---|
| Ketone conc., percent v | 5 | 5 |
| Cobalt complex conc., percent v. (chloride form) | 0 | 0.5 |
| Photolysis time, hours | 5 | 5 |
| Temperature, °C | 45 | 45 |
| | Yield, Moles per ml.×10$^6$ | |
| Product: | | |
| Ethane | 1.6 | 5.8 |
| Propylene | 290 | 414 |
| Propane | 2.0 | 21.0 |
| Isobutane | 84.6 | 100 |
| n-Butane | Trace | 1.3 |
| Isobutylene plus 1-butene | 3.5 | 11.8 |
| Trans-2-butene | 1.4 | 2.1 |
| Cis-2-butene | 0.7 | 1.1 |
| 2-methyl-1-butene | 41.9 | 43.4 |
| 2-methyl-2-butene | 14.0 | 11.9 |
| 2-methylpentane | 4.6 | 3.9 |
| C$^8$ fraction | 51.0 | 21.6 |

From these data, it is observed that the ratio of disproportionation to hydrogen atom abstraction is invariably higher when the cobalt complex catalyst is present. Further, as the steric requirement of the alkyl radical decreases, the effect of the catalyst is more pronounced. The overall effect of the catalyst with regard to disproportionation is summarized in Table VII, which tabularizes the ratio of the probability of hydrogen atom abstraction relative to disproportionation.

Table VII

| Radical | Ratio without catalyst | Ratio with catalyst |
|---|---|---|
| (CH$_3$)$_3$C· in isopentane | 1.18 | 1.09 |
| (CH$_3$)$_3$C· in neohexane | 1.16 | 1.08 |
| (CH$_3$)$_2$(H)C· | 1.44 | 1.21 |
| (CH$_3$)$_2$C—CH$_2$· (H) | 24.8 | 8.5 |

Similar results are obtained when the size of the alkyl groups of the dialkylphosphoric acid moiety of the cobalt catalyst is varied.

An additional manifestation of free radical reactivity modification in the process of the invention arises from the promotion of isomerization of olefins, for in the presence of added olefin or when olefin is employed as reaction solvent, substantial increase in production of internal olefin is observed. The data of Table VIII illustrate the effect of the addition of a cobalt complex prepared from di(2-ethylhexyl)phosphoric acid to solutions wherein acetone is subjected to photolysis in isopentane solution in the presence of added olefin.

Table VIII

| | | | | | | |
|---|---|---|---|---|---|---|
| Acetone conc., percent v | 5 | 5 | 5 | 5 | 5 | 5 |
| Added C$^5$ olefin | None | None | (a) | (a) | (b) | (b) |
| Olefin conc., percent v | 0 | 0 | 2.5 | 2.5 | 2.5 | 2.5 |
| Cobalt complex conc., percent v | 0 | 0.5 | 0 | 0.5 | 0 | 0.5 |
| Photolysis time, hours | 5 | 5 | 5 | 5 | 5 | 5 |
| Temperature, °C | 45 | 45 | 45 | 45 | 45 | 45 |
| | Yield, Moles per ml.×10$^6$ | | | | | |
| Product: | | | | | | |
| Ethane | 2.1 | 22.4 | 2.9 | 16.7 | 4.6 | 16.8 |
| Propane plus propylene | 4.2 | 23.1 | 3.5 | 13.6 | 4.2 | 10.4 |
| Isobutane | | 0.4 | | Trace | Trace | 0.2 |
| n-Butane | Trace | 1.4 | Trace | 0.7 | Trace | 0.4 |
| Isobutylene plus 1-butene | 1.0 | 2.2 | 0.8 | 1.8 | 0.7 | 1.5 |
| Trans-2-butene | 1.8 | 1.8 | 1.9 | 2.0 | 1.3 | 1.3 |
| Cis-2-butene | 1.0 | 1.2 | 1.0 | 1.3 | 0.7 | 0.8 |
| 3-methyl-1-butene | 13.5 | 6.2 | 12.2 | 8.7 | 9.1 | 11.0 |
| 2-methyl-1-butene | 71.6 | 37.5 | Added Olefin | 118 | 46.4 | 48.4 |
| 2-methyl-2-butene | 55.6 | 49.2 | 54.4 | 118 | Added Olefin | |
| 2,2-dimethylbutane | 1.8 | 10.6 | 1.8 | 8.1 | 3.4 | 7.7 |
| 2,3-dimethylbutane | 1.4 | 4.6 | 1.2 | 3.6 | 2.2 | 3.5 |
| 2-methylpentane | 0.3 | 1.6 | 0.3 | 1.1 | 0.4 | 1.1 |
| 3-methylpentane | 0.6 | 1.3 | 1.1 | 2.0 | 1.0 | 1.1 | a Represents 2-methyl-1-butene.
b Represents 2-methyl-2-butene.

From the data of Table VIII, it is observed that in the presence of added 2-methyl-2-butene, the presence of catalyst has little effect on the formation of 2-methyl-1-butene, 46.4 (moles per ml.×10⁶) without the catalyst, and 48.4 (moles per ml.×10⁶) in the presence of catalyst. However, when 2-methyl-1-butene is added the yield of 2-methyl-2-butene is increased by more than a factor of two (118 vs. 54.4).

The selective isomerization effect is more dramatically illustrated when the solvent employed is an olefin. The results of such experiments are shown in Table IX. The source of the free radicals was acetone.

*Table IX*

| Solvent | 2-methyl-1-butene | | 2-methyl-2-butene | |
|---|---|---|---|---|
| Acetone conc., percent v | 5 | 5 | 5 | 5 |
| Cobalt complex conc., percent v. (chloride form) | 0 | 0.5 | 0 | 0.5 |
| Photolysis time, hours | 6 | 6 | 6 | 6 |
| Temperature, °C | 45 | 45 | 45 | 45 |
| | Yield, Moles per ml.×10⁶ | | | |
| Product: | | | | |
| Ethane | | | 1.7 | 1.5 |
| Propane plus propylene | | Trace | 3.9 | 3.8 |
| Isobutane | | | | |
| n-Butane | | | Trace | Trace |
| Isobutylene plus 1-butene | 0.2 | 0.4 | Trace | Trace |
| Trans-2-butene | 1.8 | 1.0 | Trace | Trace |
| Cis-2-butene | 0.7 | 0.4 | Trace | Trace |
| Isopentane | | 9.0 | 7.4 | 5.5 |
| 3-methyl-1-butene | | 27.5 | 5.8 | 13.4 |
| 2-methyl-1-butene | Solvent | | 13.2 | 27.8 |
| 2-methyl-2-butene | 52.0 | 964 | Solvent | |
| 2,2-dimethylbutane | | | | |
| 2,3-dimethylbutane | Trace | 0.53 | 4.7 | 3.6 |
| 3-methylpentane | 3.0 | 2.9 | | |

The yield of 2-methyl-1-butene in 2-methyl-2-butene solution is somewhat affected by the presence of catalyst, increasing by a factor of about two. However, when 2-methyl-1-butene is employed as solvent, the yield of 2-methyl-2-butene, the internal olefin isomer, increases by a factor of about eighteen (964 vs. 52), thus illustrating the selective isomerization obtained in olefin solution through modification of the free radical reactivity.

It is believed that selective isomerization results from an enhanced preference for abstraction of non-primary allylic hydrogen atoms by the free radicals in the presence of the metal-containing catalyst. Double bond isomerization presumably then occurs through the resonance character of the radical thus formed. An illustrative reaction sequence is shown by the following equations:

$$CH_2{=}\underset{\underset{CH_3}{|}}{C}{-}CH_2{-}CH_3 + CH_3{\cdot} \longrightarrow CH_2{=}\underset{\underset{CH_3}{|}}{C}{-}CH{-}CH_3 + CH_4$$

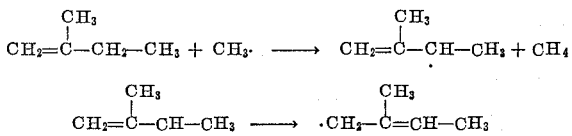

$$\cdot CH_2{-}\underset{\underset{CH_3}{|}}{C}{=}CH{-}CH_3 + HS \longrightarrow CH_3{-}\underset{\underset{CH_3}{|}}{C}{=}CH{-}CH_3 + S\cdot$$

wherein HS represents the hydrocarbon solvent.

It should be understood that the previously presented data are illustrative only, and are not to be regarded as limitations, as the teachings thereof may be varied as will be understood by one skilled in this art. The data illustrate modification of the reactivity of free radicals through the particular objects of promotion of radical coupling, radical disproportionation, and selective isomerization of olefins. Other objects will be apparent from consideration of the principles of the invention.

We claim as our invention:

1. The process for the modification of free radical reactivity in hydrocarbon solution by bringing into intimate contact alkyl free radicals and a catalytic amount of a hydrocarbon-soluble transition metal salt of a hydrocarbon-soluble hydrocarbyl partial ester of phosphoric acid.

2. The process for the modification of free radical reactivity in hydrocarbon solution by bringing into intimate contact alkyl free radicals and a catalytic amount of a hydrocarbon-soluble catalyst complex prepared by reacting a transition metal oxide, a salt of said transition metal, and dialkylphosphoric acid.

3. The process of claim 2 wherein the transition metal is cobalt.

4. The process of claim 2 wherein the catalyst is prepared by reaction of cobaltous oxide, a cobaltous salt selected from the group consisting of cobaltous chloride and cobaltous nitrate, and di(2-ethylhexyl)phosphoric acid.

5. The process for the promotion of free radical coupling in hydrocarbon solution by bringing into intimate contact alkyl free radicals of from 1 to 2 carbon atoms, inclusive, and a catalytic amount of a hydrocarbon-soluble catalyst complex prepared by reacting a transition metal oxide, a salt of said transition metal, and dialkylphosphoric acid.

6. The process of claim 5 wherein the catalyst is the complex prepared by reacting cobaltous oxide, a water-soluble cobaltous salt, and di-(2-ethylhexyl)phosphoric acid.

References Cited by the Examiner

UNITED STATES PATENTS

| | | | |
|---|---|---|---|
| 2,642,402 | 6/1953 | Corner et al. | 260—683.15 |
| 2,758,143 | 8/1956 | Arundale et al. | 260—683.15 |
| 2,786,878 | 3/1957 | Arundale et al. | 260—683.15 |
| 3,035,104 | 5/1962 | Harvey et al. | 260—683.15 |

ALPHONSO D. SULLIVAN, *Primary Examiner*.